United States Patent [19]

Nakajima et al.

[11] Patent Number: 4,804,841
[45] Date of Patent: Feb. 14, 1989

[54] RADIATION IMAGE READ-OUT METHOD

[75] Inventors: Nobuyoshi Nakajima; Takehumi Nagata, both of Kanagawa; Hiroshi Tanaka, Tokyo, all of Japan

[73] Assignee: Fuji Photo Film Co., Ltd., Kanagawa, Japan

[21] Appl. No.: 873,888

[22] Filed: Jun. 13, 1986

[30] Foreign Application Priority Data

Jun. 13, 1985 [JP] Japan ................. 60-128915

[51] Int. Cl.$^4$ .............................. G01T 1/105
[52] U.S. Cl. .................. 250/327.2; 250/484.1; 364/413.26
[58] Field of Search ............ 250/327.2, 484.1; 364/414

[56] References Cited

U.S. PATENT DOCUMENTS 4,620,097 10/1986 Tanaka et al. ................. 250/327.2
4,638,162 1/1987 Tanaka et al. ................. 250/484.1

Primary Examiner—Carolyn E. Fields
Assistant Examiner—Richard E. Hanig
Attorney, Agent, or Firm—Sughrue, Mion, Zinn, Macpeak & Seas

[57] ABSTRACT

In a radiation image read-out method wherein preliminary read-out is conducted prior to final read-out for adjusting final read-out conditions and/or image processing conditions for a radiation image stored on a stimulable phosphor sheet, a histogram of preliminary read-out image signals obtained by the preliminary read-out is created. A characteristic value of the preliminary read-out image signals within a region at least outside of a sharp peak region arising near the maximum signal value and/or the minimum signal value in the histogram is calculated. The final read-out conditions and/or the image processing conditions are adjusted based on the characteristic value.

3 Claims, 4 Drawing Sheets

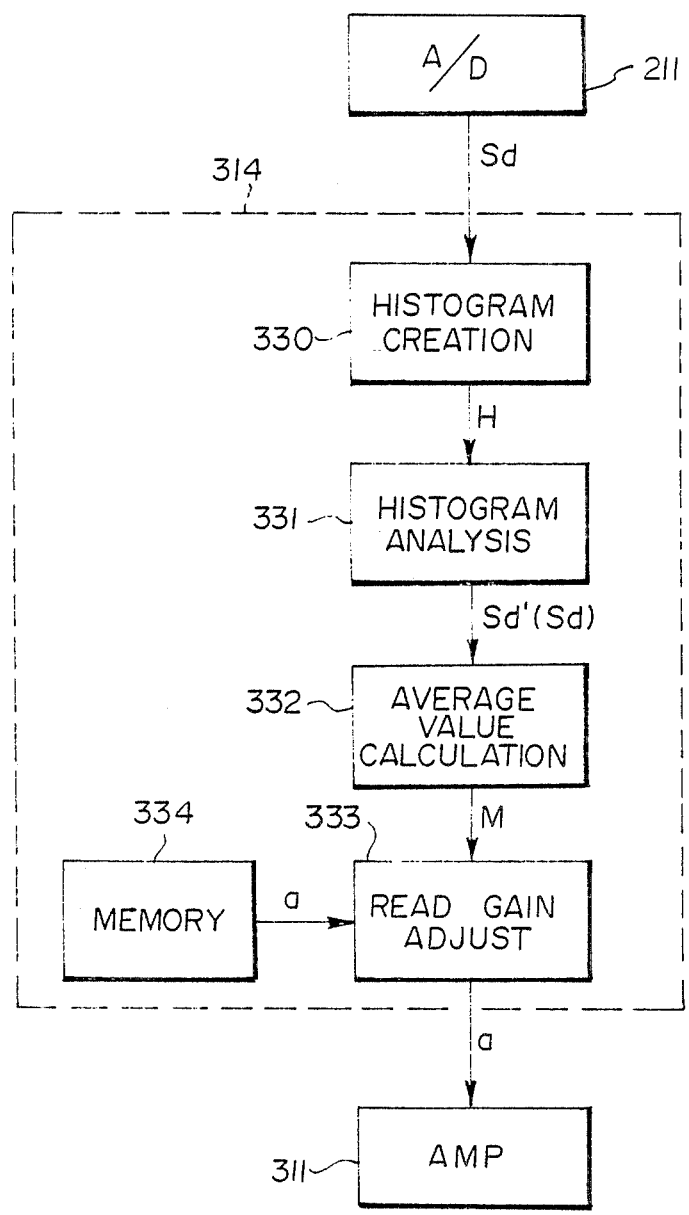

RADIATION IMAGE READ-OUT METHOD

BACKGROUND OF THE INVENTION

1. Field of the Invention

This invention relates to a method of reading out a radiation image stored on a stimulable phosphor sheet by exposing the stimulable phosphor sheet to stimulating rays which cause it to emit light in proportion to the stored radiation energy, and photoelectrically detecting the emitted light. This invention particularly relates to a radiation image read-out method wherein preliminary read-out is conducted for approximately detecting the image input information prior to final read-out for reproducing a visible image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored on the stimulable phosphor varies over a very wide range in proportion to the amount of energy stored thereon, it is possible to obtain an image having desirable density regardless of the amount of exposure of the stimulable phosphor to the radiation, by reading out the emitted light with an appropriate read-out gain and converting it to an electric signal to reproduce a visible image on a recording medium on a display device. The electric signal may further be processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired.

However, in order to eliminate various influences caused by the fluctuation of radiographic exposure conditions and/or to obtain a radiation image having high image quality or a high diagnostic efficiency and accuracy, it is necessary to investigate such image input conditions of the radiation image stored on the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in Japanese Unexamined Patent Publication No. 58(1983)-67240. In this method, a read-out operation for detecting the image input information of a radiation image stored on a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain is adjusted, and/or an appropriate signal processing is conducted, and/or the scale factor is adjusted to an appropriate value on the basis of the image nput information obtained by the preliminary read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input conditions and the image input pattern of a radiation image stored on the stimulable phosphor sheet can be investigated in advance, it is possible to obtain a radiation image having an improved image quality, particularly a high diagnostic efficiency and accuracy by adjusting the read-out gain and the scale factor on the basis of the detected image input information and by processing the detected electric signal in the manner most suitable for the image input pattern without using a read-out system having a wide dynamic range.

Various methods have been proposed to detect the image input information on the stimulable phosphor sheet based on the preliminary read-out image signals obtained by the preliminary read-out. As one of the methods, it has been proposed to calculate the average value of the preliminary read-out image signals detected within a predetermined region. The average value represents the level of the preliminary read-out image signals as a whole. Therefore, for example, by adjusting the read-out gain in the final read-out based on the average value, it is possible to adjust the level of the final read-out image signal to maintain it always within a correct range.

However, when the image input information on the stimulable phosphor sheet is detected as described above, the problem as described below arises. FIGS. 4A and 4B are explanatory views showing the condition of an object image recorded on the stimulable phosphor sheet. In the case where a direct radiation impingement region B, i.e. the background region where the radiation impinges upon the stimulable phosphor sheet without passing through an object D, as indicated by hatching in FIG. 4A, is recorded within an image region A at which the aforesaid average value is calculated, or the image of a protector C for protecting the object D from the radiation as shown in FIG. 4B or the image of a portion injected with barium contrast media in contrasted image recording of a digestive organ is recorded within the image region A, the image input information on the object D is not obtained accurately. Specifically, the level of radiation energy stored in the stimulable phosphor sheet is very high at the direct radiation impingement region B and very low at the images of the protector C and the portion injected with barium contrast media. Therefore, the average value of the preliminary read-out image signals becomes substatially high or low. However, since such regions are not relaed to the object, the average value obtained in this manner does not correctly represents the image input information on the object.

The same problem arises in all of the cases where the read-out conditions in the final read-out and/or the image processing conditions are adjusted on the basis of a characteristic value of the preliminary read-out image signals which is affected markedly by the direct radiation impingement region or the protector region.

SUMMARY OF THE INVENTION

The primary object of the present invention is to provide a radiation image read-out method wherein image input information on an object is detected accurately by preliminary read-out by eliminating adverse effects of a specific region such as a direct radiation impingement region, a protector region or a portion injected with contrast media.

Another object of the present invention is to provide a radiation image read-out method suitable for reproducing a visible radiation image having an improved image quality, particularly a high diagnostic efficiency and accuracy.

The present invention provides a radiation image read-out method in which, prior to final read-out wherein a stimulable phosphor sheet carrying a radiation image of an object stored thereon is exposed to stimulating rays which cause the stimulable phosphor sheet to emit light in proportion to the stored radiation energy, the emitted light is photoelectrically detected to obtain an electric image signal for reproducing a visible image, a preliminary read-out for approximately detecting the radiation image stored on the stimulable phosphor sheet is conducted by use of stimulating rays of a level lower than the level of stimulating rays used in the final read-out, read-out conditions in the final read-out and/or image processing conditions are adjusted on the basis of the information obtained by the preliminary read-out, and the final read-out is carried out by use of the adjusted conditions, wherein the improvement comprises the steps of:

(i) creating a histogram of preliminary read-out image signals obtained by said preliminary read-out, (ii) calculating a characteristic value (such as an average value or a median value) of said preliminary read-out image signals within a region at least outside of a sharp peak region arising in the vicinity of the maximum signal value and/or the minimum signal value in said histogram, and (iii) adjusting said read-out conditions in the final read-out and/or said image processing conditions on the basis of said characteristic value.

The sharp peak region arising in the vicinity of the maximum signal value in the histogram is caused by the aforesaid direct radiation impingement region. On the other hand, the sharp peak region arising in the vicinity of the minimum signal value in the histogram is caused by a section where the radiation is absorbed markedly by the aforesaid protector, contrast media, or the like. Therefore, the characteristic value of the image signals within the region at least outside of the sharp peak region accurately represents the image input information on the object by eliminating adverse effects of the direct radiation impingement region, the protector, the contrast media, or the like.

With the radiation image read-out method in accordance with the present invention, it is possible to accurately detect the image input information on the object by eliminating the adverse effects of the direct radiation impingement region or a specific region such as the direct radiation impingement region, the protector region or a portion injected with contrast media, and to accurately adjust the read-out conditions in the final read-out and/or the image processing conditions. Accordingly, regardless of the position at which the object is placed at the step of radiation image recording and a special image recording is conducted by using the protector or contrast media, it becomes possible to always reproduce a visible radiation image having an improved image quality, particularly a high diagnostic efficiency and accuracy.

BRIEF DESCRIPTION OF THE DRAWINGS

FIG. 2 is a block diagram showing a part of the system of FIG. 1,

DESCRIPTION OF THE PREFERRED EMBODIMENTS

The present invention will hereinbelow be described in further detail with reference to the accompanying drawings.

Figure 1:
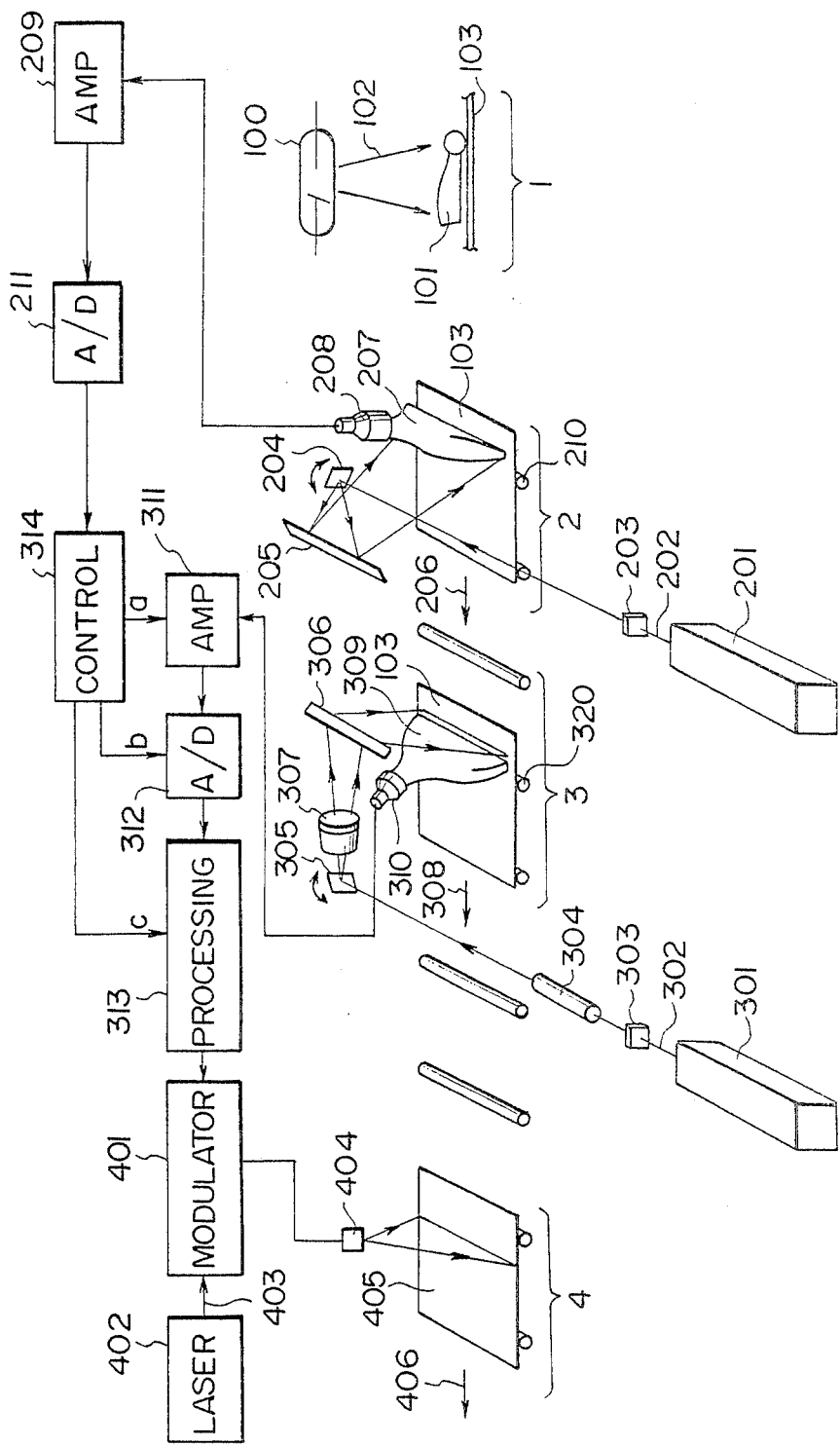
FIG. 1 is a schematic view showing the radiation image recording and reproducing system wherein an embodiment of the radiation image read-out method in accordance with the present invention is employed.

FIG. 1 shows a radiation image recording and reproducing system wherein radiation image read-out is conducted by use of an embodiment of the radiation image read-out method in accordance with the present invention. Basically, the radiation image recording and reproducing system comprises a recording section 1, a preliminary read-out section 2 and a final read-out section 3 in which the method of the present invention is employed, and an image reproducing section 4. X-rays 102 emitted by an X-ray source 100 at the recording section 1 to an object 101 pass through the object 101 and impinge upon a stimulable phosphor sheet 103.

The stimulable phosphor sheet 103 carrying a radiation image of the object 101 recorded thereon is sent to the preliminary read-out section 2. Examples of the stimulable phosphor used in the stimulable phosphor sheet 103 are described in detail, for example, in U.S. Pat. No. 4,236,078 and European Patent Publication No. 21,342.

In the preliminary read-out section 2, a laser beam 202 emitted by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out.

The "stimulation energy" referred to in this invention means the effective energy of the stimulating rays which the stimulable phosphor sheet recieves per unit area.

As the ratio of the stimulation energy of the stimulating rays in the preliminary read-out to the stimulation energy of the stimulating rays in the final read-out increases, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the final read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit adjustment of the read-out conditions or the image processing conditions, that is, insofar as the light emitted by the stimulable phosphor sheet in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted by the stimulable phosphor sheet in the preliminary read-out.

When exposed to the laser beam 202 as described above, the stimulable phosphor sheet 103 emits light in proportion to the X-ray energy stored thereon, and the emitted light enters a light guide member 207 which may be of a shape and a material as disclosed in U.S. Pat. No. 4,346,295. The light is guided inside of the light guide member 207 through total reflection, emitted from a light output face of the light guide member 207 and received by a photodetector 208 which may be constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into an electric signal carrying the image input information. The electric signal is amplified by an amplifier 209, and the signal generated thereby is digitized by an A/D converter 211 and sent to a control circuit 314 at the final read-out section 3. On the basis of the image input information thus obtained, the control circuit 314 calculates a read-out gain (amplification degree) setting value (a), a scale factor setting value (b) and an image processing condition setting value (c).

After the preliminary read-out is finished, the stimulable phosphor sheet 103 is sent to the final read-out section 3. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an f$\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the X-ray energy stored therein, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emitted from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The light emitted by the stimulable phosphor sheet 103 and detected by the photodetector 310 in the final read-out is converted into an electric signal, amplified to an appropriate level by an amplifier 311 the read-out gain of which has been adjusted by the read-out gain setting value (a), and then sent to an A/D converter 312. In the A/D converter 312, the electric signal is converted into a digital signal by use of a scale factor which has been set by the scale factor setting value (b) to suit the width of signal fluctuation. The digital signal thus obtained is sent to a signal processing circuit 313, in which it is processed on the basis of the image processing condition setting value (c) so as to obtain a radiation image suitable for viewing, particularly for diagnostic purposes. The electric image signal obtained by the signal processing circuit 313 is sent to a light modulator 401 at the image reproducing section 4. As for the signal processing, it is possible to employ a frequency processing as disclosed in U.S. Pat. Nos. 4,315,318, 4,346,295 or 4,387,428, or European Patent Publication No. 31,952, and a gradation processing as disclosed in U.S. Pat. Nos. 4,302,672, 4,276,473 or 4,310,886.

In the image reproducing section 4, a laser beam 403 emitted by a reproducing laser beam source 402 is modulated by the light modulator 401 on the basis of the electric image signal received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the scanning direction, i.e. in the direction as indicated by the arrow 406. Accordingly, the radiation image is recorded on the photosensitive material 405. For reproducing the radiation image, it is also possible to use any other appropriate method. For example, the final signal obtained at the final read-out section 3 may be electronically displayed on a display device such as a CRT, or the final radiation image may be recorded by use of a video tape recorder or a printer. Alternatively, the radiation image may be reproduced on a thermosensitive recording material by use of heat waves.

Figure 3A:
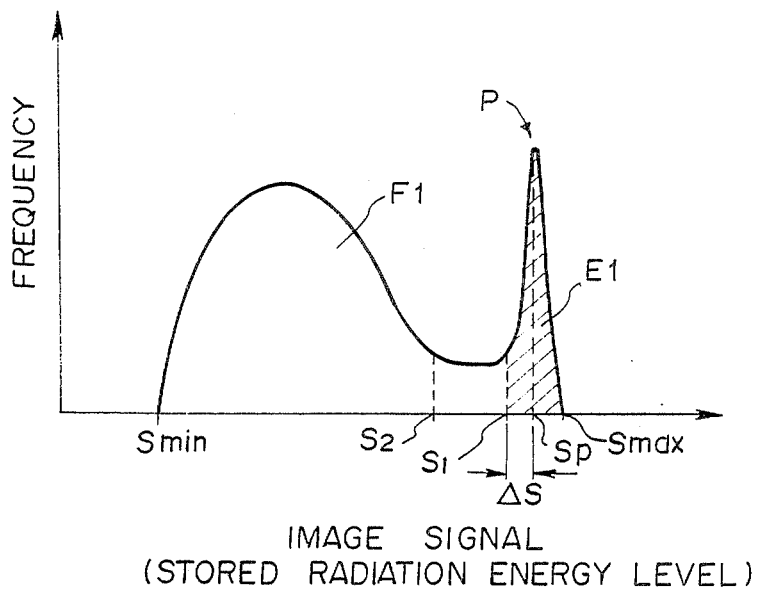
FIGS. 3A and 3B are graphs showing the histograms of the preliminary read-out image signals.

Adjustment of the final read-out conditions in the control circuit 314 will hereinbelow be described in detail. FIG. 2 shows the read-out gain adjusting section of the control circuit 314. The digital preliminary read-out image signal Sd generated by the A/D converter 211 is sent to a histogram creating section 330 of the control circuit 314, wherein a histogram of the preliminary read-out image signal Sd is created. In many cases, the preliminary read-out or the histogram analysis at the preliminary read-out section 2 is carried out for the image region A which is a part of the whole image region as shown in FIG. 4A, and the histogram of the preliminary read-out image signal Sd at the image region A is created. In the case where a direct radiation impingement region B of large area is present within the image region A as shown in FIG. 4A, the histogram includes a sharp peak region E1 in the vicinity of the maximum signal value Smax as indicated by hatching in FIG. 3A. On the other hand, when an image of a protector C of large area is recorded inside of the image region A as shown in FIG. 4B or when an image of a portion injected with contrast media is recorded in the image region a, the obtained histogram includes a sharp peak region E2 in the vicinity of the minimum signal value Smin as indicated by hatching in FIG. 3B.

A histogram analysis section 331 shown in FIG. 2 receives histogram information H from the histogram creating section 330, and analyzes it. When the sharp peak region E1 is present as shown in FIG. 3A, the histogram analysis section 331 sends an image signal Sd' at a region F1 outside of the sharp peak region E1 to an average value calculating section 332. To obtain the image signal Sd' at the region F1, for example, the image signal between a signal S1 of a level lower by a predetermined level $\Delta S$ than an image signal Sp, at which the frequency in the sharp peak region E1 is the maximum as indicated by the maximum frequency point P in FIG. 3A, and the minimum signal valus Smin may be extracted. Instead of eliminating only the sharp peak region E1 as described above, an arbitrary region (between S1 and S2 in FIG. 3A) continuing to the sharp peak region E1 may also be eliminated together with the sharp peak region E1, and the image signal between S2 and Smin may be extrated. In the case where the image signal between S2 and Smin is extracted and the average value thereof is calculated as described below, the density of the reproduced visible image obtained finally becomes higher as a whole than when the image signal between S1 and Smin is extracted and the average value thereof is calculated. In the case where the sharp peak region E1 and the region between S1 and S2 continuing thereto are eliminated as described above, S2 may be selected by considering the image recording portion of the object, the concerned region in the reproduced visible image, or the like.

Figure 3B:
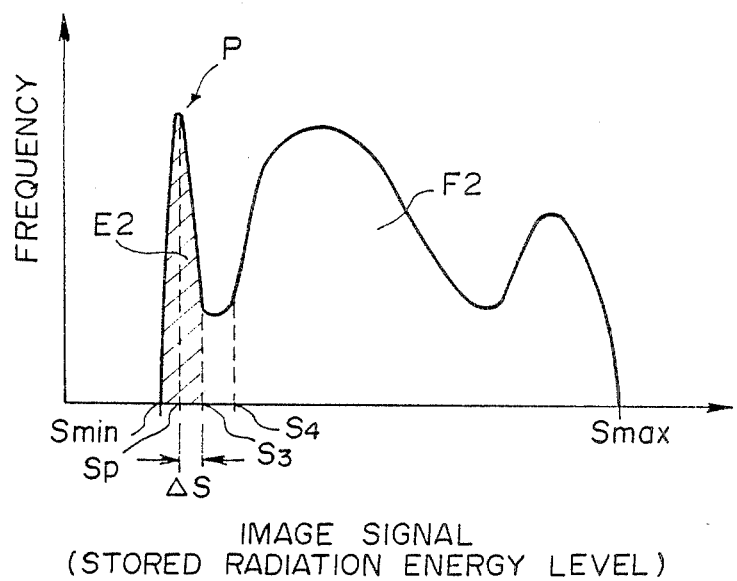
Figure 4A:
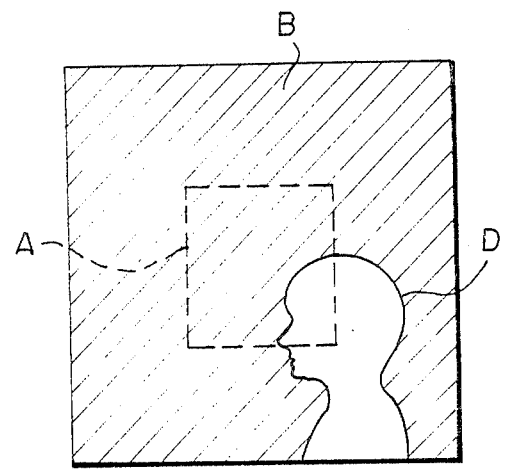
FIGS. 4A and 4B are explanatory views showing the condition of an object image recorded on a stimulable phosphor sheet.
Figure 4B:
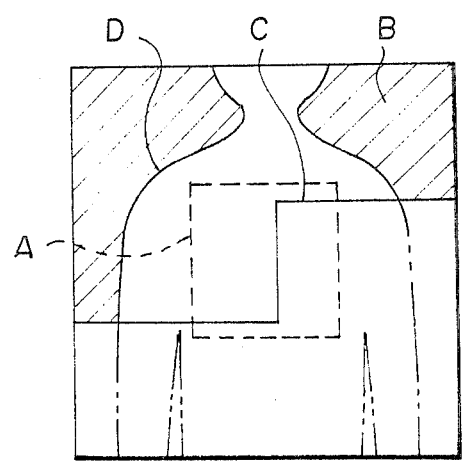

In the case where the sharp peak region E2 as shown in FIG. 3B is present, the histogram analysis section 331 sends the image signal Sd' at a region F2 outside of the sharp peak region E2 to the average value calculating section 332. To obtain the image signal Sd' at the region F2, for example, the image signal between a signal S3 of a level higher by a predetermined level ΔS than an image signal Sp, at which the frequency in the sharp peak region E2 is the maximum as indicated by the maximum frequency point P in FIG. 3B, and the maximum signal value Smax may be extracted. Instead of eliminating only the sharp peak region E2 as described above, an arbitrary region (between S3 and S4 in FIG. 3B) continuing to the sharp peak region E2 may also be eliminated together with the sharp peak region E2, and the image signal between S4 and Smax may be extracted. In the case where the image signal between S4 and Smax is extracted and the average value thereof is calculated as described below, the density of the reproduced visible image obtained finally becomes lower as a whole than when the image signal between S3 and Smax is extracted and the average value thereof is calculated. In this case too, S4 may be selected by considering the image recording portion of the object, the region of importance in the reproduced visible image, or the like.

In the case where the sharp peak regions E1 and E2 are not present, the histogram analysis section 331 sends all of the preliminary read-out image signal Sd to the average value calculating section 332.

The average value calculating section 332 calculates an average value M of the image signal Sd' or Sd. The average value M represents the level of the image signal Sd' or Sd as a whole, and a read-out gain setting value (a) suitable for the average value M is stored in a memory 334. The read-out gain adjusting section 333 receives a signal representing the average value M from the average value calculating section 332, reads the read-out gain setting value (a) stored in conformity with the average value M from the memory 334, and sends the read-out gain setting value (a) to the amplifier 311.

The average value of the image signal Sd' at the region F1 at least outside of the sharp peak region E1 or at the region F2 at least outside of the sharp peak region E2 correctly represents the image input information on the object D by eliminating adverse effects of the direct radiation impingement region B or the image of the protector C or the portion injected with contrast media. Therefore, when the read-out gain in the final read-out is adjusted based on the average value, it is possible to obtain a read-out image signal suitable for reproducing a visible image of the object D at a correct density.

The radiation image read-out method of the present invention is applicale also to the adjustment of the scale factor setting value (b) and the image processing condition setting value (c). Though the read-out gain is adjusted based on the average value of the preliminary read-out image signal in the aforesaid embodiment, the image input information on the object may also be ascertained by a characteristic value other than the average value, and the method of the present invention is applicale also to the case where the read-out conditions in the final read-out and/or the image processing conditions are adjusted on the basis of a characteristic value other than the average value. As such a characteristic value other than the average value, the median value may be used. In the case where the median value is used as the characteristic value and the histogram as shown in FIG. 3A or 3B is obtained, the image signal between S1 and Smin outside of the sharp peak region E1 or the image signal between S3 and Smax outside of the sharp peak region E2 is extracted from the whole histogram, the median value is calculated, and the read-out conditions in the final read-out and/or the image processing conditions are adjusted on the basis of the median value. Though the image signal between S2 and Smin or the image signal between S4 and Smax may be extracted and the median value thereof may be calculated, the median value thus obtained is equal to the median value calculated from the image signal between S1 and Smin or between S3 and Smax.

Further, though the preliminary read-out is conducted for the image region A which is a part of the whole image region in the aforesaid embodiment, the radiation image read-out method of the present invention is applicable also to the case where the read-out conditions in the final read-out and/or the image processing conditions are adjusted on the basis of the preliminary read-out image signal for the whole image region.

As described, for example, in Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveying means and the final read-out is conducted. At the preliminary read-out step, the energy of stimulating rays is adjusted lower than the energy of stimulating rays used in the final read-out. The present invention is also applicable to such a case.

We claim:

1. A radiation image read-out method in which, prior to final read-out wherein a stimulable phosphor sheet carrying a radiation image of an object stored thereon is exposed to stimulating rays which cause the stimulable phosphor sheet to emit light in proportion to the stored radiation energy, the emitted light is photoelectrically detected to obtain an electric image signal for reproducing a visible image, preliminary read-out for approximately detecting the radiation image stored on the stimulable phosphor sheet is conducted by use of stimulating rays of a level lower than the level of stimulating rays of a level lower than the level of stimulating rays used in the final read-out, read-out conditions in the final read-out and/or image processing conditions are adjusted on the basis of the information obtained by the preliminary read-out, and the final read-out is carried out by use of the adjusted conditions, wherein the improvement comprises the steps of:
(i) creating a histogram of preliminary read-out image signals obtained by said preliminary read-out,
(ii) determining the presence of a sharp peak region arising in the vicinity of at least one of the maximum signal value and the minimum signal value in said histogram,
(iii) calculating a characteristic value of said preliminary read-out image signals within a region at least outside of the sharp peak region arising in the vicinity of the maximum signal value and/or the minimum signal value in said histogram, and
(iv) adjusting said read-out conditions in the final read-out and/or said image processing conditions on the basis of said characteristic value.

2. A method as defined in claim 1 wherein said characteristic value is an average value of said preliminary read-out image signals at a region at least outside of a sharp peak region arising in the vicinity of the maximum signal value and/or the minimum signal value in said histogram.

3. A method as defined in claim 1 wherein said characteristic value is a median value of said preliminary read-out image signals at a region at least outside of a sharp peak region arising in the vicinity of the maximum signal value and/or the minimum signal value in said histogram.

* * * * *